United States Patent

Walz et al.

[11] Patent Number: 5,133,858
[45] Date of Patent: Jul. 28, 1992

[54] REVERSE OSMOSIS WATER PURIFICATION APPARATUS

[75] Inventors: David K. Walz, Stone Mountain; John A. McMillan, Atlanta; Kenneth R. Weil, Norcross, all of Ga.

[73] Assignee: Layton Manufacturing Corporation, Santa Ana, Calif.

[21] Appl. No.: 621,229

[22] Filed: Nov. 30, 1989

[51] Int. Cl.⁵ .............................................. B01D 61/08
[52] U.S. Cl. ................................. 210/136; 210/321.8; 210/440; 210/443; 210/448; 55/158
[58] Field of Search ............... 210/136, 440, 443, 447, 210/448, 321.6, 321.78, 321.79, 321.8; 55/158

[56] References Cited

U.S. PATENT DOCUMENTS

| | | | |
|---|---|---|---|
| 4,715,952 | 12/1987 | Casey, Jr. | 210/136 |
| 4,935,134 | 6/1990 | Hersgen et al. | 210/447 |
| 4,971,689 | 11/1990 | Burrows | 210/136 |
| 4,990,248 | 2/1991 | Brown et al. | 210/136 |
| 4,992,166 | 2/1991 | Lowsky et al. | 210/440 |
| 5,006,235 | 4/1991 | Cooper | 210/136 |
| 5,022,986 | 6/1991 | Lang | 210/440 |
| 5,026,478 | 6/1991 | Tanabe et al. | 210/440 |

Primary Examiner—Robert A. Dawson
Assistant Examiner—Wanda L. Millard
Attorney, Agent, or Firm—Rodgers & Rodgers

[57] ABSTRACT

A reverse osmosis water purification apparatus includes a housing sump, a protective canister disposed within the sump, a filter assembly, an outwater conduit and a manifold disposed within the canister, a valve cap mounted atop the manifold and operably related therewith and including a mounting bracket arranged for securement to a fixed support, a top cap disposed atop the valve cap, an inlet for unfiltered water, an outlet for filtered water together with an outlet for unfiltered water mounted on the valve cap, a rotatable collar threadedly coupled with the housing sump and cooperating with the valve cap to hold the parts in assembled condition or to render the housing sump, canister, filter units, outwater conduit and the manifold separable from the valve cap and parts associated therewith so as to enable the canister and its contents to be removed and replaced with new units without requiring the services of a skilled technician.

10 Claims, 4 Drawing Sheets

REVERSE OSMOSIS WATER PURIFICATION APPARATUS

TECHNICAL FIELD

This invention is concerned with reverse osmosis water purification apparatus which primarily though not exclusively is intended for mounting underneath a kitchen sink or in some other accessible location.

BACKGROUND ART

U.S. Pat. No. 4,715,952 issued Dec. 29, 1987 and assigned to the assignee of this invention discloses a reverse osmosis water purification element and cartridge which is similar to the present invention but which requires the services of a skilled and knowledgeable technician in order to replace used filter units with new units without damaging the delicate membrane which forms an essential part of such units.

U.S. Pat. No. 4,874,514 issued Oct. 17, 1989 and assigned to the assignee of this invention discloses a tubular element for reverse osmosis water purification. The element of this patent can be used in the practice of the present invention or a slightly different filter unit may be used as is disclosed in this application.

SUMMARY

A reverse osmosis water purification apparatus according to one form of this invention utilizes a housing sump in which a protective canister is disposed and in which disposable filter units and an outwater conduit are mounted, a manifold disposed atop and in communication with the filter units and the outwater conduit, a valve cap disposed atop the manifold and arranged to cooperate therewith so as to supply water to be purified into the canister and purified water to be conveyed out of the housing sump and also provides an outlet for unpurified water supplied to the canister, a collar threadedly related with the housing sump and in engagement with a part of the valve cap so that rotation of the collar in one direction releases the housing sump and parts included therein from the valve cap and parts associated therewith so that the canister and parts associated therewith may be removed and renewal components may be reinserted into the housing sump and reassembled by appropriate application of the collar with the valve cap and parts associated therewith by someone who is not skilled in this art and who can replace worn out filter units without damaging the replacement units.

BEST MODE OF CARRYING OUT THE INVENTION

Figure 1:
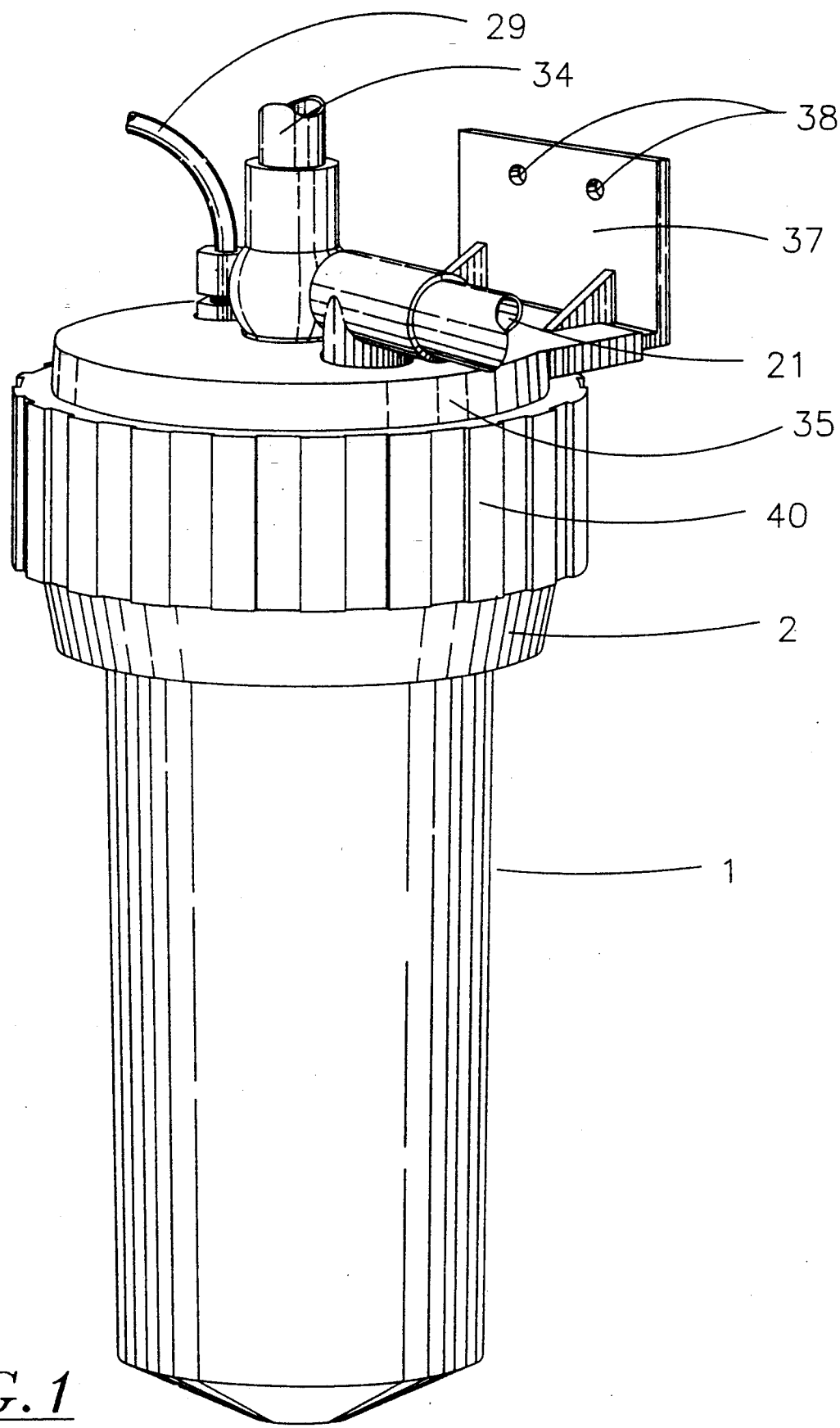
FIG. 1 is a perspective overall view of a reverse osmosis water purification apparatus formed according to this invention.
Figure 2:
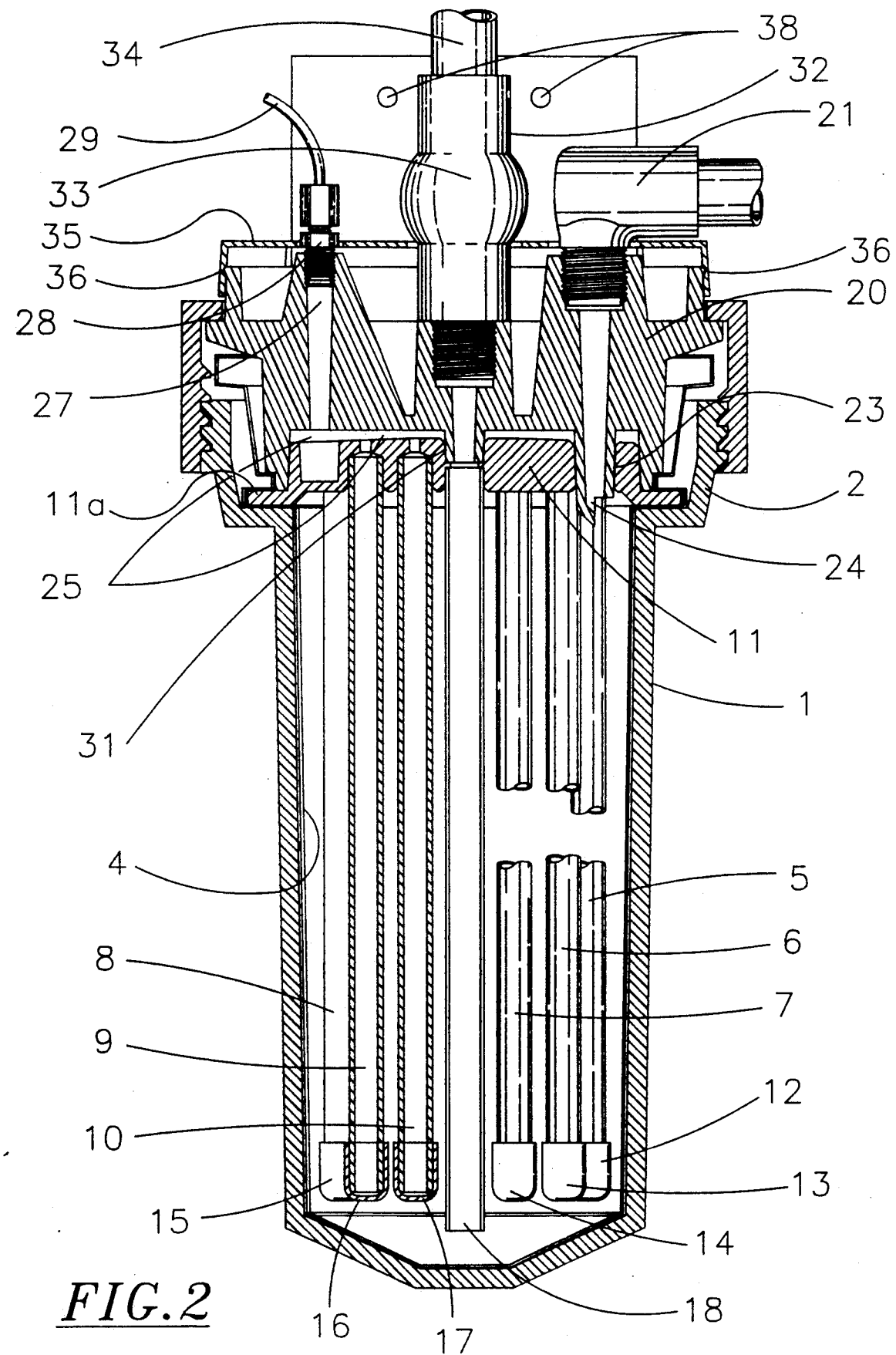
FIG. 2 is a vertical cross sectional view of the apparatus shown in FIG. 1.

In the drawings, the numeral 1 designates the housing sump and the numeral 2 designates the outwardly projecting flange formed atop the housing sump. Flange 2 includes exterior threads 3. Preferably the housing sump may be formed by an injection molding process.

Figure 4:
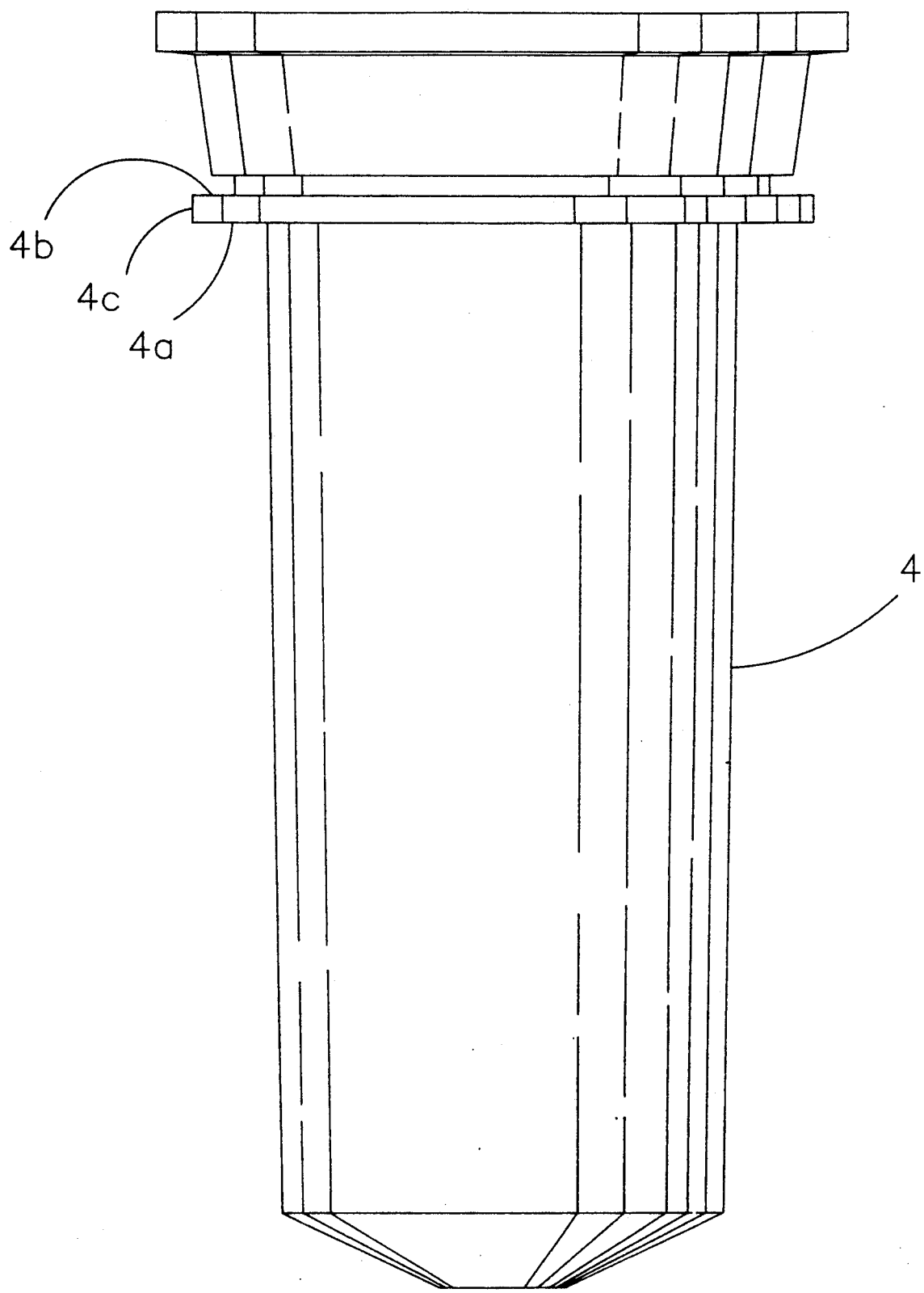
FIG. 4 is a side view of the canister.

Disposed within the housing sump 1 is a canister 4 the lower portion of which conforms closely with that of the inner surfaces of housing sump 1 and is formed of blow molded high density polyethelyne. Disposed within the canister 4 is manifold 11 and elongated rod like filter elements 5-10 the upper ends of which are inserted into cavities formed in manifold 11 which is formed of elastomeric material. While only six tubes such as 5-10 are shown, it will be understood that a greater number of tubes such as 29 ordinarily are used. As is obvious from FIG. 4, canister 4 includes a lower flange 4a, an upper flange 4b interconnected by intermediate part 4c. These parts envelope the flange 11a of manifold 11 to form a fluid tight seal therebetween. The lower ends of the filter units 5-10 are closed by caps 12-17. The tubes 5-10 may, if desired, be formed according to U.S. Pat Nos. 4,874,514, 4,844,805 or 4,917,847 owned by the assignee of this invention.

As is apparent from the drawings, the upper end of outwater conduit 18 as well as of filter tubes 5-10 are inserted into cavities formed in manifold 11.

In order to supply unfiltered water to canister 4 and to discharge filtered water from the canister and also to discharge unfiltered water from the canister, valve cap 20 is provided and is formed of injection molded ABS. The lower part of valve cap 20 is disposed within the upper part of canister 4.

In order to form a fluid tight seal between manifold 11 and valve cap 20 to convey incoming water, a downwardly extending projection 22a is formed on valve cap 20 and is enveloped by a cooperating cavity 23 formed in manifold 11 to form a fluid tight junction therebetween for supplying unfiltered water to canister 4.

Water supplied to canister 4 seeps through the filter membrane on the outer surfaces of filter tubes 5-10 and through the perforated tubes about which the filter membrane is secured and thus is received within these hollow tubes. Such filtered water under pressure flows upwardly into an accumulating passage 25 and thence upwardly through an outlet passage 27 through check valve 28 and conveyor line 29 to a point of use or to a storage tank.

In order to form a junction between valve cap 20 and outwater conduit 18 to provide for ejecting unfiltered water, a downwardly extending projection 30 is formed on the lower surface of valve cap 20. This projection is received within a cavity 31 formed in manifold 11 so as to form a fluid tight junction therebetween. Water supplied upwardly through outwater conduit 18 passes upwardly through downwardly extending projection 30 thence through a coupling 32 which contains a conventional check valve 33 arranged to prevent back flow of water from the outgoing line 34 back into the canister 4. Such unfiltered water may be used where purification is not necessary such as for washing dishes, watering flowers and the like.

In order to impart swirling motion to inflowing water, an angularly dispose nozzle structure 24 is formed on downwardly extending projection 22a so that incoming water is caused to swirl and circulate about the interior of canister 4 thus to cleanse the exterior surfaces of the tubes 5-10.

A top cap 35 is provided and overlies the valve cap 20. Top cap 35 is formed of injection molded polypropylene and is secured atop valve cap 20 by a snap fit as shown at 36. For mounting the unit, a mounting bracket 37 is formed as a part of the valve cap 20 and is provided with a pair of holes 38 which facilitate mounting of the purification unit to a stationary structure.

The filter tubes 5-10 ordinarily with proper use will last for approximately 3 years at which time they must be replaced with new tubes in order to continue efficient purification of water.

Figure 3:
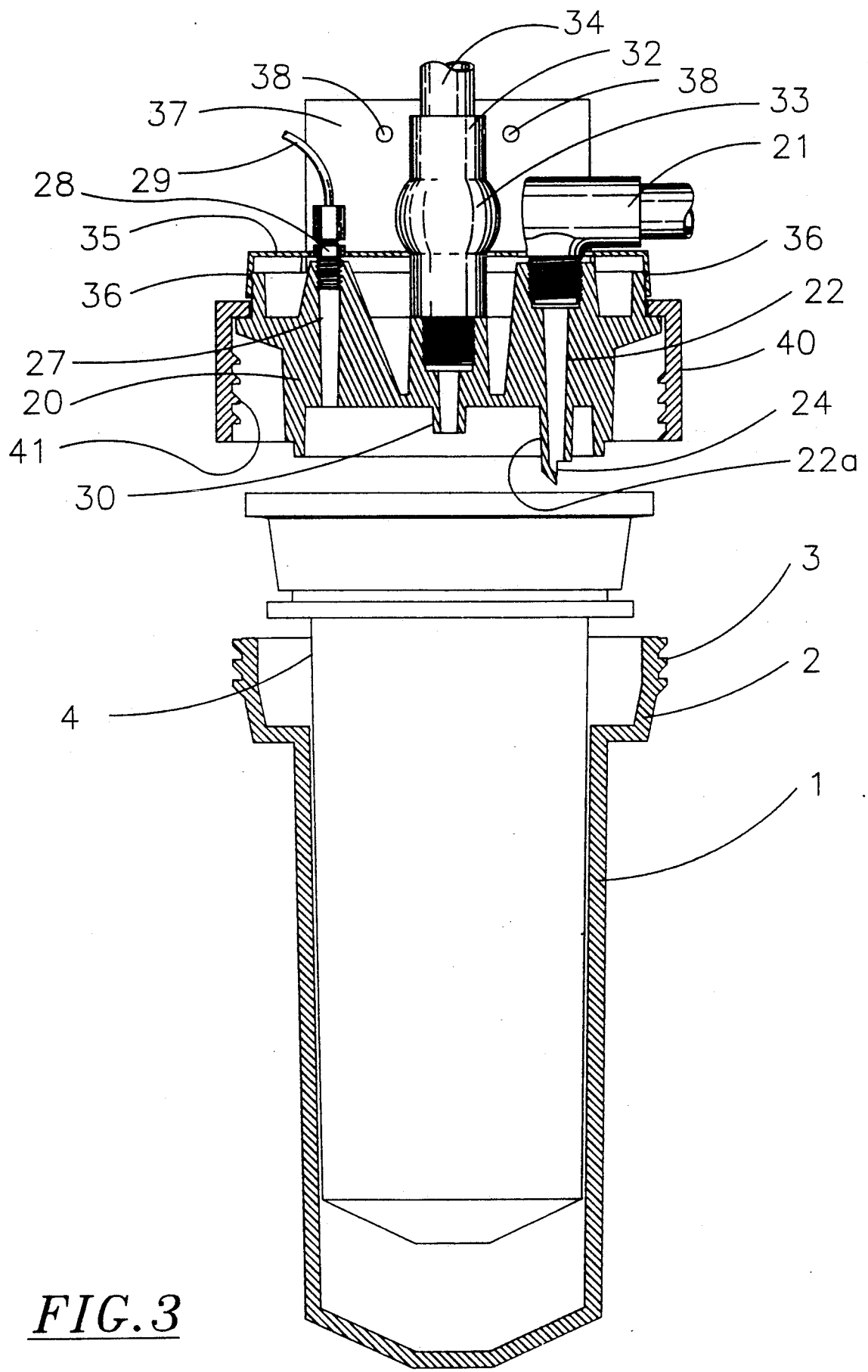
FIG. 3 is a cross sectional view similar to FIG. 2 but which shows the valve cap and parts associated therewith in spaced relation with the housing sump so that the canister and parts included therein may be removed bodily and replaced by new elements without incurring damage to the delicate semipermeable membrane which forms an essential part of the filter units.

According to a main feature of this invention, the housing sump and canister assembly may be lowered as shown in FIG. 3 after the collar 40 is manually rotated until its internal threads 41 disengage the external threads 3 on the housing sump 1. Collar 40 is formed of injection molded polycarbonate. Thereafter the canister 4 and all of the parts associated therewith as indicated in FIG. 3 are lifted out of the housing sump 1 and replaced by new structure following which the housing sump 1 and its contents are elevated and once again secured into operating position by appropriate rotation of the collar 40.

Thus according to this invention, an unskilled person such as a homeowner without special knowledge of water purification may remove the worn out structure and replace it with new structure without requiring the services of a plumber or some other skilled technician.

We claim:

1. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, a collar having a part in engagement with a projection of said valve cap and threadedly related with said housing sump for detachably securing said housing sump to said valve cap thereby to render said canister, said filter units, said outwater conduit and said manifold accessible for removal and replacement, and a second outlet passage is formed in said valve cap and in communication with said outwater conduit for conveying unfiltered water out of said unit and which includes a downwardly extending projection enveloped in a fluid tight manner by a cavity formed in said manifold.

2. A reverse osmosis water purification unit according to claim 1 wherein a check valve is arranged to prevent reverse flow of unfiltered water into said canister and wherein said second outlet passage is in communication with said outwater conduit.

3. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, a collar having a part in engagement with a projection of said valve cap and threadedly related with said housing sump for detachably securing said housing sump to said valve cap thereby to render said canister, said filter units, said outwater conduit and said manifold accessible for removal and replacement, a check valve disposed in said outlet passage formed in said valve cap for preventing reverse flow of filtered water into said filter units, a top cap overlying said valve cap and secured thereto by snap fastening means and a mounting bracket formed integrally with said valve cap and arranged for securement to a fixed support.

4. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, a collar having a part in engagement with a projection of said valve cap and threadedly related with said housing sump for detachably securing said housing sump to said valve cap thereby to render said canister, said filter units, said outwater conduit and said manifold accessible for removal and replacement, a check valve disposed in said outlet passage formed in said valve cap for preventing reverse flow of filtered water into said filter units, a top cap overlying said valve cap and secured thereto by snap fastening means and a mounting bracket formed integrally with said valve cap and arranged for securement to a fixed support said top cap being formed of injection molded polypropylene.

5. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, a collar having a part in engagement with a projection of said valve cap and threadedly related with said housing sump for detachably securing said housing sump to said valve cap thereby to render said canister, said filter units, said outwater conduit and said manifold accessible for removal and replacement, and a check valve disposed in said outlet passage formed in said valve cap for preventing reverse flow of filtered water into said filter units.

6. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, and a collar having a part in engagement with a projection of said valve cap and threadedly related with said housing sump for detachably securing said housing sump to said valve cap thereby to render said canister, said filter units, said outwater conduit and said manifold accessible for removal and replacement, said housing sump being formed by injection molding.

7. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, and a collar having a part in engagement with a projection of said valve cap and threadedly related with said housing sump for detachably securing said housing sump to said valve cap thereby to render said canister, said filter units, said outwater conduit and said manifold accessible for removal and replacement, said manifold being formed of elastomomeric material.

8. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, and a collar having a part in engagement with a projection of said valve cap and threadedly related with said housing sump for detachably securing said housing sump to said valve cap thereby to render said canister, said filter units, said outwater conduit and said manifold accessible for removal and replacement, said canister being formed of blow molded high density polyethelyne.

9. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, and a collar having a part in engagement with a projection of said valve cap and threadedly related with said housing sump for detachably securing said housing sump to said valve cap thereby to render said canister, said filter units, said outwater conduit and said manifold accessible for removal and replacement, said collar being formed of injection molded polycarbonate.

10. A reverse osmosis water purification unit comprising a housing sump, a filter assembly removably disposed within said housing sump and including a protective canister arranged to enclose disposable filter units and an outwater conduit and configured to conform generally with the interior of said housing sump, a manifold disposed atop said canister, a valve cap disposed atop said manifold and having a water inlet passage in communication with said disposable filter units and which includes a downwardly extending projection enveloped by a cavity formed in said manifold in a fluid tight manner, an outlet passage formed in said valve cap for conveying filtered water out of said water purification unit, and a collar having a part in engagement with a projection of said valve cap and threadedly related with said housing sump for detachably securing said housing sump to said valve cap thereby to render said canister, said filter units, said outwater conduit and said manifold accessible for removal and replacement, said valve cap being formed of injection molded ABS.

* * * * *